United States Patent
Canonico et al.

(10) Patent No.: US 10,744,446 B2
(45) Date of Patent: Aug. 18, 2020

(54) FABRIC MATERIAL COMPOSITE CONSTRUCTION FOR USE AS A FILTER MEANS

(71) Applicant: SAATI S.P.A., Appiano Gentile (CO) (IT)

(72) Inventors: Paolo Canonico, Appiano Gentile (IT); Liuba Napoli, Appiano Gentile (IT)

(73) Assignee: SAATI S.P.A., Appiano Gentile (CO) (IT)

(*) Notice: Subject to any disclaimer, the term of this patent is extended or adjusted under 35 U.S.C. 154(b) by 0 days.

(21) Appl. No.: 16/577,684

(22) Filed: Sep. 20, 2019

(65) Prior Publication Data

US 2020/0009492 A1      Jan. 9, 2020

Related U.S. Application Data

(62) Division of application No. 15/782,715, filed on Oct. 12, 2017, which is a division of application No. 13/138,696, filed as application No. PCT/EP2010/053110 on Mar. 11, 2010, now abandoned.

(30) Foreign Application Priority Data

Apr. 29, 2009   (IT) .............................. MI2009A0730

(51) Int. Cl.
| | |
|---|---|
| *H04R 25/00* | (2006.01) |
| *B01D 46/54* | (2006.01) |
| *B01D 39/08* | (2006.01) |
| *D04H 1/728* | (2012.01) |
| *B01D 46/00* | (2006.01) |

(52) U.S. Cl.
CPC ......... *B01D 46/546* (2013.01); *B01D 39/083* (2013.01); *D04H 1/728* (2013.01); *B01D 2239/025* (2013.01); *B01D 2239/0471* (2013.01); *B01D 2239/0478* (2013.01); *B01D 2239/065* (2013.01); *B01D 2239/0681* (2013.01)

(58) Field of Classification Search
CPC ........ H04R 25/00; H04R 25/02; H04R 25/45; H04R 25/456; H04R 25/65; H04R 25/658; H04R 27/00; H04R 27/04; H04R 2400/00; H04R 2400/001; H04R 2400/03; H04R 2400/07; H04R 2400/11; H04R 2410/00; H04R 2410/01; H04R 2410/03; H04R 2410/07; H04M 99/00; H04M 2201/00; H01M 2/00; H01M 2/02; H01M 2/10; H01M 2/14; H01M 2/1094; H01M 2/04; H01M 2/08; B01D 46/546; B01D 39/083; B01D 2239/025
USPC ..... 210/507, 500.1, 503, 504, 505, 506, 508
See application file for complete search history.

(56) References Cited

U.S. PATENT DOCUMENTS

| | | | |
|---|---|---|---|
| 2007/0106344 A1* | 5/2007 | Darley ..................... | H04R 1/02 607/55 |
| 2008/0230309 A1* | 9/2008 | Fox ........................... | B32B 5/26 181/286 |

FOREIGN PATENT DOCUMENTS

| | | | | |
|---|---|---|---|---|
| EP | 1757406 B1 | * | 2/2009 | ............. B24B 37/24 |
| JP | 2883082 B2 | * | 4/1999 | |

\* cited by examiner

*Primary Examiner* — Allison G Fitzsimmons
(74) *Attorney, Agent, or Firm* — Hedman & Costigan, P.C.; James V. Costigan; Kathleen A. Costigan (57) ABSTRACT

A fabric material composite construction, for use as a filter means or media, characterized in that said construction comprises a combination of one or more nanofiber layers and a synthetic single-thread squarely knitted precision fabric.

8 Claims, 12 Drawing Sheets

Fig. 1

| Sample | Filtration efficiency (%) | | | | | |
|---|---|---|---|---|---|---|
| | 48 µm | 52 µm | 60 µm | 68 µm | 72 µm | 76 µm |
| PA 120.30 WO | 74.69 | 87.45 | 92.91 | 95.76 | 96.94 | 97.74 |

Fig. 2

| Sample | Nanofibers | Area Weight [gsm] | Contact Angle Fibrodat | Air Permeability [l/m^2s] | Acoustic Impedance [MKS Rayls] | Filtration efficiency (%) | | | | | | |
|---|---|---|---|---|---|---|---|---|---|---|---|---|
| | | | | | | 2 µm | 5 µm | 10 µm | 20 µm | 30 µm | 50 µm |
| 1 - Side A (Woven Textile) | PUR | 0.26 | 106.3° | 50.0 | | 68.89 | 69.32 | 69.32 | 69.12 | 69.23 | 86.90 |
| 1 - Side B (Nanofibers layer) | | | 106.8° | 56.7 | > 2000 | 97.61 | 97.56 | 96.89 | 96.00 | 95.05 | 95.95 |
| 2 - Side A (Woven Textile) | PUR | 0.1 | 114° | 203.3 | | 98.25 | 99.31 | 99.57 | 99.61 | 99.60 | 99.81 |
| 2 - Side B (Nanofibers layer) | | | 95.3° | 253.3 | 793.0 | 96.07 | 98.07 | 98.52 | 98.84 | 99.13 | 99.81 |
| 3 - Side A (Woven Textile) | PA6/12 | 0.66 | 107.5° | 166.7 | | 97.24 | 98.12 | 97.85 | 97.32 | 96.92 | 99.36 |
| 3 - Side B (Nanofibers layer) | | | 122.1° | 153.3 | 1321.8 | 98.56 | 99.30 | 99.18 | 98.91 | 98.67 | 99.86 |
| 4 - Side A (Woven Textile) | PA6/12 | 0.44 | 109.2° | 496.7 | | 86.35 | 95.96 | 98.04 | 98.03 | 97.80 | 99.68 |
| 4 - Side B (Nanofibers layer) | | | 125.2° | 453.3 | 389.2 | 92.87 | 98.72 | 98.89 | 98.57 | 98.10 | 99.52 |

Fig. 3

| Sample | Filtration efficiency (%) | | | | | |
|---|---|---|---|---|---|---|
| | 48 µm | 52 µm | 60 µm | 68 µm | 72 µm | 76 µm |
| PES AM 120.34 WB | 91.62 | 94.80 | 97.61 | 99.28 | 99.57 | 99.72 |

Fig. 4

| Sample | Nanofibers | Area Weight [gsm] | Contact Angle Fibrodat | Air Permeability [l/m^2s] | Acoustic Impedance [MKS Rayls] | Filtration efficiency (%) | | | | | |
|---|---|---|---|---|---|---|---|---|---|---|---|
| | | | | | | 2 µm | 5 µm | 10 µm | 20 µm | 30 µm | 50 µm |
| 1 - Side A (Woven Textile) | PUR | 0.14 | 69.9° | 305.0 | | 93.41 | 98.34 | 99.18 | 99.40 | 99.57 | 99.88 |
| 1 - Side B (Nanofibers layer) | | | 88.6° | 386.7 | 839.6 | 73.79 | 85.99 | 92.84 | 95.07 | 96.20 | 97.47 |
| 4 - Side A (Woven Textile) | PUR | 0.22 | 84.8 | 58.3 | | 98.65 | 99.44 | 99.49 | 99.38 | 99.19 | 99.66 |
| 4 - Side B (Nanofibers layer) | | | 97.9 | 51.7 | >2000 | 99.52 | 99.86 | 99.90 | 99.92 | 99.92 | 99.89 |
| 2 - Side A (Woven Textile) | PA6/12 | 0.56 | 68.6° | 345.0 | | 93.75 | 99.46 | 99.72 | 99.72 | 99.67 | 99.64 |
| 2 - Side B (Nanofibers layer) | | | 105° | 333.3 | 681.0 | 93.88 | 99.28 | 99.44 | 99.46 | 99.56 | 99.47 |
| 3 - Side A (Woven Textile) | PA6/12 | 0.8 | | 123.3 | | 96.31 | 96.68 | 95.89 | 95.53 | 95.96 | 99.02 |
| 3 - Side B (Nanofibers layer) | | | 113.8° | 125.0 | 1791.9 | 97.74 | 98.35 | 98.05 | 97.80 | 97.75 | 97.71 |

Fig. 5

| Sample | Nanofibers | Area Weight [gsm] | Air Permeability [l/m^2s] | Acoustic Impedance [MKS Rayls] | Filtration efficiency (%) | | | | | | |
|---|---|---|---|---|---|---|---|---|---|---|---|
| | | | | | 2 µm | 5 µm | 10 µm | 20 µm | 30 µm | 50 µm |
| 1 - Side A (Woven Textile) | PA | 0.56 on one side | 235.0 | 923 | 99.88 | 99.98 | 99.98 | 99.99 | 99.98 | 99.92 |
| 1 - Side B (Nanofibers layer) | | | 226.7 | 938.1 | 96.77 | 98.60 | 98.97 | 98.83 | 98.41 | 97.17 |
| 2 - Nanofibers on both sides | PA | 0.28 | 152.8 | 1083 | 97.23 | 98.72 | 98.81 | 98.65 | 98.31 | 98.09 |
| 3 - Nanofibers on both sides | PA | 0.56 | 120.0 | 1781 | 98.22 | 98.24 | 97.90 | 97.61 | 97.33 | 99.24 |

Fig. 6

| Sample | Nanofibers | Area Weight [gsm] | Water Intrusion [mbar] | Air Permeability [l/m^2s] | Acoustic Impedance [MKS Rayls] | Filtration efficiency (%) | | | | | | | | |
|---|---|---|---|---|---|---|---|---|---|---|---|---|---|---|
| | | | | | | 2 μm | 3 μm | 4 μm | 5 μm | 6 μm | 7 μm | 8 μm | 9 μm |
| 1 - Side A (Woven Textile) | PA | 0.36 + glue on one side | 9.7-10.5 | 164.0 | 1178 | 98.64 | 99.07 | 99.33 | 99.48 | 99.56 | 99.62 | 99.66 | 99.70 |
| 1 Side B (Nanofibers layer) | | | 10.9-12.3 | 158.0 | 1162.0 | 97.65 | 98.29 | 98.67 | 98.67 | 98.95 | 99.02 | 99.09 | 99.17 |

FABRIC MATERIAL COMPOSITE CONSTRUCTION FOR USE AS A FILTER MEANS

This application is a division of Ser. No. 15/782,715, filed Oct. 12, 2017 which is a division of Ser. No. 13/138,696, filed Sep. 19, 2011 which is a national stage application of PCT/EP2010/053110, filed Mar. 11, 2010 which claims the priority of Italian Application Serial No. MI2009A000730, filed Apr. 29, 2009.

BACKGROUND OF THE INVENTION

The present invention relates to a fabric material composite construction for use as a filter means or media.

At present, particles having a particle size less than 1-2 microns cannot be separated by filtering fabric materials, because of technologic limitations of the weaving process preventing from weaving fabric materials with a mesh opening less than 5 microns.

SUMMARY OF THE INVENTION

Accordingly, the aim of the present invention is to provide a fabric material composite construction preventing particles having a particle size of 1-2 microns from passing therethrough.

Within the scope of the above mentioned aim, a main object of the invention is to provide such a fabric material composite construction having precise and selective filtering properties like those of precision fabrics, together with a powder filtering capability.

Yet another object of the present invention is to provide such a fabric material composite construction adapted to increase the life span of filtering media made thereby.

Yet another object of the present invention is to provide such fabric material composite construction having an acoustical impedance less than that of fabric materials with a similar mesh size, for use in acoustical applications also providing a protective function, for example in a cellular phone where the fabric also protect phone inner parts from magnetic and powder particles, that is a fabric with a very small mesh size and a low fabric impedance, while allowing sound to pass therethrough.

The above mentioned aim and objects, as well as yet other objects, which will become more apparent hereinafter are achieved by a fabric material composite construction for use as a filter means or media, characterized in that said construction comprises a combination of one or more nanofiber layers and a synthetic single-thread squarely knitted precision fabric.

The nanofiber layer, in particular, is overlapped or coated on said single-thread fabric by an electro-spinning coating method and being embedded in said supporting fabric thereby forming a single or cohesively bound filtering means or media.

A further adhesive material layer, for example an aqueous solution acrylic glue material, may also be deposited on the above fabric construction, to increase the fabric material and nanofibers cohesive binding.

Thus, the above fabric material provides a very high structural strength filtering membrane.

According to one aspect of the present invention, it is also possible to deposit a nanofiber layer on both the fabric material faces and/or to bind thereto an additional fabric layer thereby forming a sandwich fabric arrangement including therein the nanofiber layer, which is very advantageous in several filtering applications such as acoustic, vehicle, white good, water, diagnostic and medical filtering applications requiring highly micrometric particle filtering efficient and permeable filtering media preserving good flowrate properties.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative, example, in the accompanying drawings, where.

DESCRIPTION OF THE PREFERRED EMBODIMENTS

With reference to the number references of the above mentioned figures, the composite fabric construction according to the present invention comprises a synthetic single-thread plain mesh precision fabric material.

It should be pointed out that, owing to its very even and coherent mesh structure, the inventive fabric has high strength and good handling characteristics making said composite fabric an ideal base material for filtering applications.

In fact, said composite fabric has a very even fabric weight, thickness, surface properties, temperature resistance, much improved with respect to those of multi-thread prior fabrics, the above advantageous properties being held constant through the overall length of the fabric roll and from one fabric batch to another fabric batch.

However, the inventive precision fabric is made with very narrow tolerance range, thereby providing a filtering means or media having a consistent filtering efficiency and air flow permeability, and this, as stated, with its constant pore size and constant properties of the single thread or yarn used for weaving it.

Moreover, the precision fabric has a very good resistance against weather agents, water, and moisture, and may be easily made on an industrial scale.

The above synthetic single-thread squarely knitted precision fabric may be made of polyester, polyamide, polypropylene, polyphenylsulphide, PEEK, PVDF, PTFE, with a mesh size in a mesh size range from 2000 µm to 5 µm, and may be used as a supporting base for supporting the nanofiber layer or membrane.

The fabric may also be made of organic polymers comprising: PA 6, PA 6/12, Polyaramides, PUR, PES, PVA, PVAC, PAN, PEO, PS, conductive polymers (polythiophenes), fluorine based polymers and so on.

The fabric may also be made of biopolymers comprising kitosan, keratine, collagen, peptides and so on.

The base fabric is selected based on its mesh size and materials, the deposited nanofiber amount, the thickness of the deposited layer and nanofiber forming polymer based on the characteristics required for the intended application.

It is also possible to electrospin biopolymers adapted for medical applications, not necessarily of a filtering type, requiring a biocompatibility of the used material.

In studying the coupled or laminated fabric/nanofiber membrane filtering means, a range of fabric materials of a class Saati and an electrospinnable polymer class have been used.

In particular the nanofibers and substrate have been so designed as to provide a maximum filtering efficiency with an acceptable pressure loss and permeability.

In this connection it should be pointed out that the word "filter" means herein any tridimensional systems where a geometrical dimension can be considered as a main one with respect to the other two.

In nanofibers, in particular, the diameter is less than 1 micron, and of the order of nanometers (100-900 nm).

The properties of said nanofibers and nanofiber fabric material comprise a large specific surface, a high surface/volume ratio, a small pore size, a high porosity, a tridimensional pattern, a high permeability and a low air-flow resistance, a good separation of the particles, a good capability of rejecting powder materials and improved physical-mechanical properties thereby allowing to achieve a self-evident-"gain" with respect to the fiber active area, improved filtering properties and self-evident advantages from a flow standpoint.

The above mentioned very good multifunctional properties allow to use said nanofibers within a broad range of application such as:
technical textile materials;
filtering means or media, for filtering liquid and air;
protective and barrier fabric materials (in sanitary, military, cloth article applications and so on);
biomedical devices and materials (drug releasing vectors, haemostatic devices, specialized organic fabric and bandage materials);
in medical and diagnostic fields;
in sound absorption applications;
as a composite material reinforcement;
as a cosmetic skin mask (cleansing agents and skin drug therapies);
bridge arrangements for organic fabric materials such as cutaneous porous membranes, tubular arrangements for recovering blood vessels and nervous tissues, tridimensional bridges for recovering bones and cartilages).

Moreover, the fabric and nanofiber construction according to the present invention may be also used in a system for depositing polymeric nanofibers on a fabric substrate by an electrospinning process which may be applied to a broad range of polymeric materials which may be also modified by adding suitable additives thereto, thereby providing improved performance fabric materials to be used in specifically designed application.

As is known, an electrospinning process provides the following main great advantages:
a possibility of quickly and simply switching from a laboratory scale to an industrial scale;
a high production yield;
a good repeatability;
a precise control of the fiber size and pattern;
a precise control of the deposited fiber amount;
an easy and quick control of the fiber production yield;
an easy modification of the fabric material properties by merely adding additives to the starting solution;
a low consume of raw materials (with a very light nanofiber weft pattern and accordingly a consequent inexpensive production due to the material saving);
a room temperature of the process, without any risk of degrading materials, and with a low power consume operating cost, and a great economic efficiency;
an easy maintenance and servicing of the process systems;
highly safe operating characteristics.

Moreover, the electrospinning process allows to "cold spin" nanometric size polymeric fibers starting from a concentrated polymeric solution subjected to a suitable outer electrical field.

Figure 1:
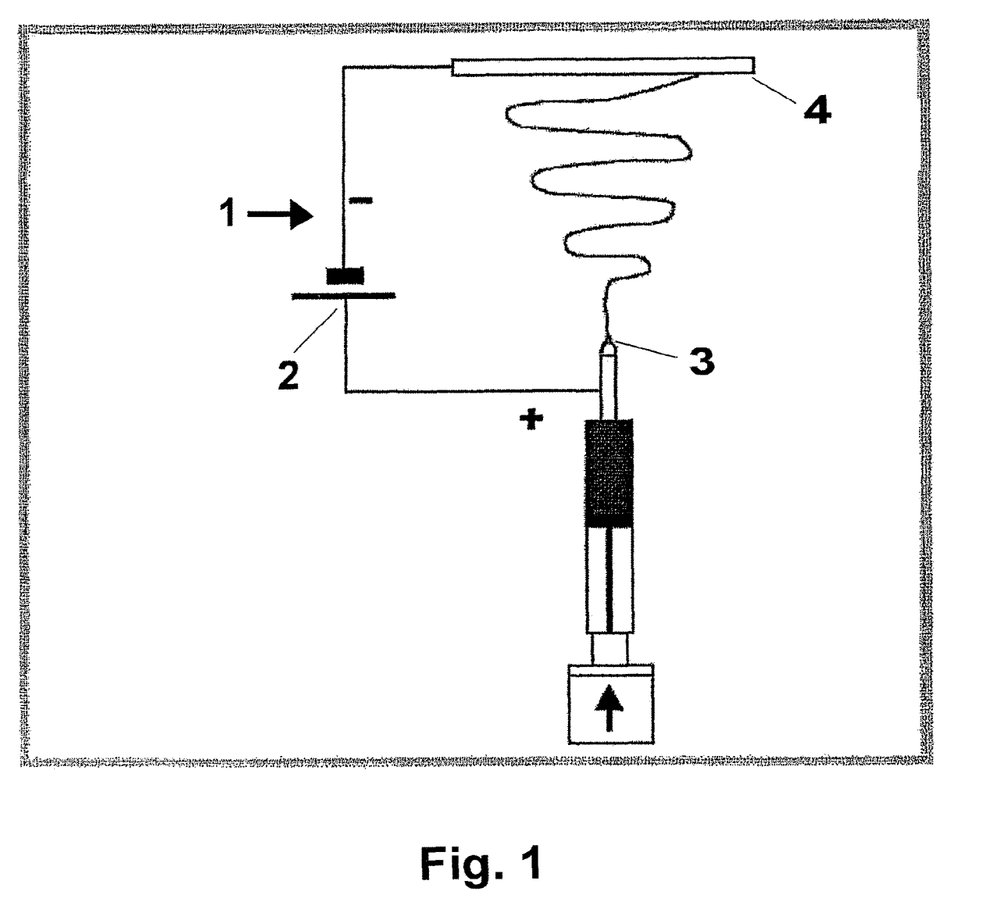
FIG. 1 schematically shows an electro-spinning apparatus.

A very simple electrospinning apparatus for performing the above process, generally indicated by the reference number 1 in FIG. 1, comprises essentially the following three main component elements:
a voltage source, generally indicated by the reference number 2, adapted to generate a high potential difference (5-50 kV);
a die arrangement 3, that is a device providing filaments, including a syringe, a capillary and nozzle assembly, a related vessel, and so on, therefrom is ejected a polymeric solution and which operates as a positive electrode; and
a collector 4 thereon the electrospun nanofibers are collected and which operates as a counter-electrode.

In this apparatus, by applying the electric field, the solution is charged thereby providing electrostatic forces opposing to the surface tension, to generate an instability phenomenon forming a jet.

By quickly evaporating the solvent the cross-section is reduced with a great elongation of the jet which becomes a thin continuous filament, which starts to solidify and is deposited on the collector surface.

In the apparatus, the synthetic single-thread fabric material is arranged on the counter-electrode, at a given suitable distance from the die arrangement.

By applying a set potential difference between the two electrodes, the nanofibers are jet deposited directly on the filtering fabric material, or may also be deposited with a random oriented pattern, to form on the fabric a weft pattern having a high surface/volume ratio and a very small pore size, the deposited nanofibers being bound to the fabric both by chemical and physical forces, thereby providing an integral assembly therewith.

A plasma pre-processing of the fabric material may also be used to further improve the adhesion of said nanofibers to the sublayer and their depositing evenness.

To further increase this adhesion, it is moreover possible to provide such a distance between the die arrangement and the counter-electrode thereon the substrate is supported, that said nanofibers are not in a dry condition as they contact the filtering fabric.

The process parameters to be adjusted to achieve different property nanofiber layers are the fiber size, pore average size, deposited layer thickness and nanofiber layer weight ($g/m^2$).

The electrospinning process may be controlled by adjusting the process parameters, material properties and environmental conditions.

The nanofiber diameter, their characteristics and properties may be easily modulated by further adjusting the process parameters.

The starting solution is characterized by its viscosity, polymer concentration, and solvent electric conductivity and volatility.

The environmental conditions are characterized by the relative moisture, temperature and pressure, while the process conditions are characterized by the applied potential difference, distance between the die arrangement and depositing surface, distance between the electrodes, the solution flow and depositing speed.

Upon testing the results of the present invention, it has been possible to detect the most significant parameters of the inventive process, and the tests have been repeated by varying the values of said parameters, up to optimize the end product, to provide geometrically homogeneous fibers having such a size and construction as to provide a homogeneous and even distribution of the pore size with a high efficiency in filtering micrometric particles, while holding a controlled high permeability by modulating the layer thickness and average pore size.

Experimental Results

Inventive fabric samples have been characterized with respect to their filtering efficiency by using a filtering efficiency test bench and a conventional Saati system to verify the particle rates locked by the filtering means, the flow resistance of the laminated or coupled material, determined by measuring its permeability and the sound passage resistance determined by acoustic impedance measurements.

A lot of different fabric samples made both of polyester and nylon covered PA, PUR polymeric nanofibers have been made and characterized.

The most significant results are listed thereinbelow.
PA 120.30 WO Fabric Covered by Nanofiber
Characteristics of the Base Fabric:
Mesh size=55 μm
High permeability 5600 I/m^2 s
CA Fibrodat 111.9°

Figure 2:
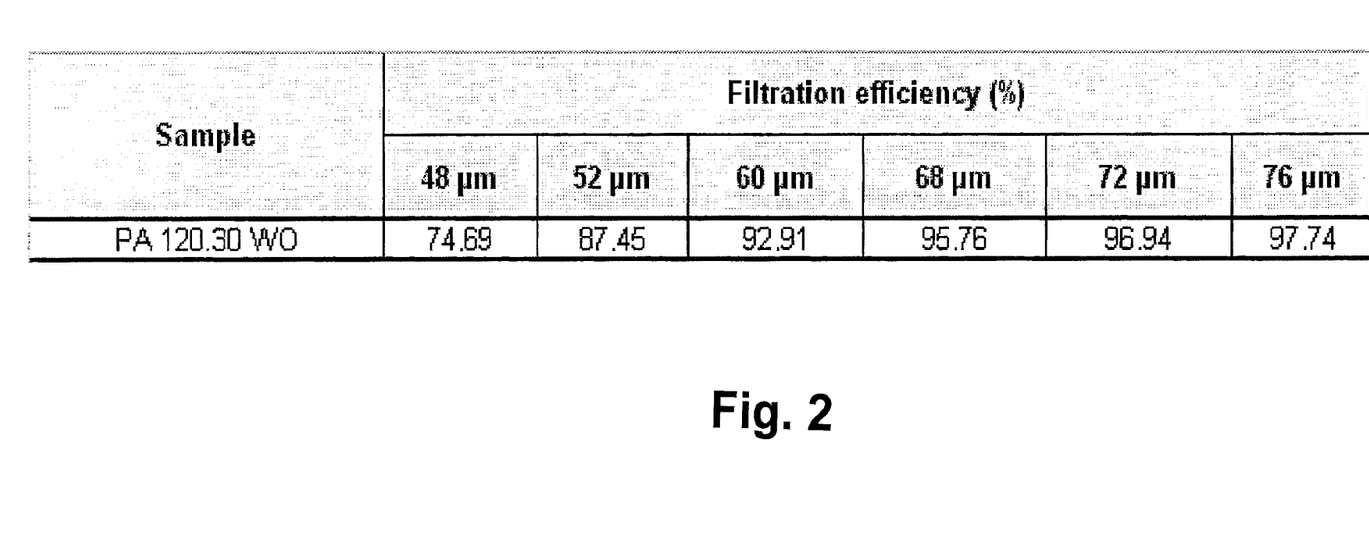
FIG. 2 shows a table showing the characterizing parameters of the base PA 120.30 WO fabric material, together with its filtering efficiency.

The table of FIG. 2 shows the filtering efficiency characterizing parameters of the inventive base fabric.

Figure 3:
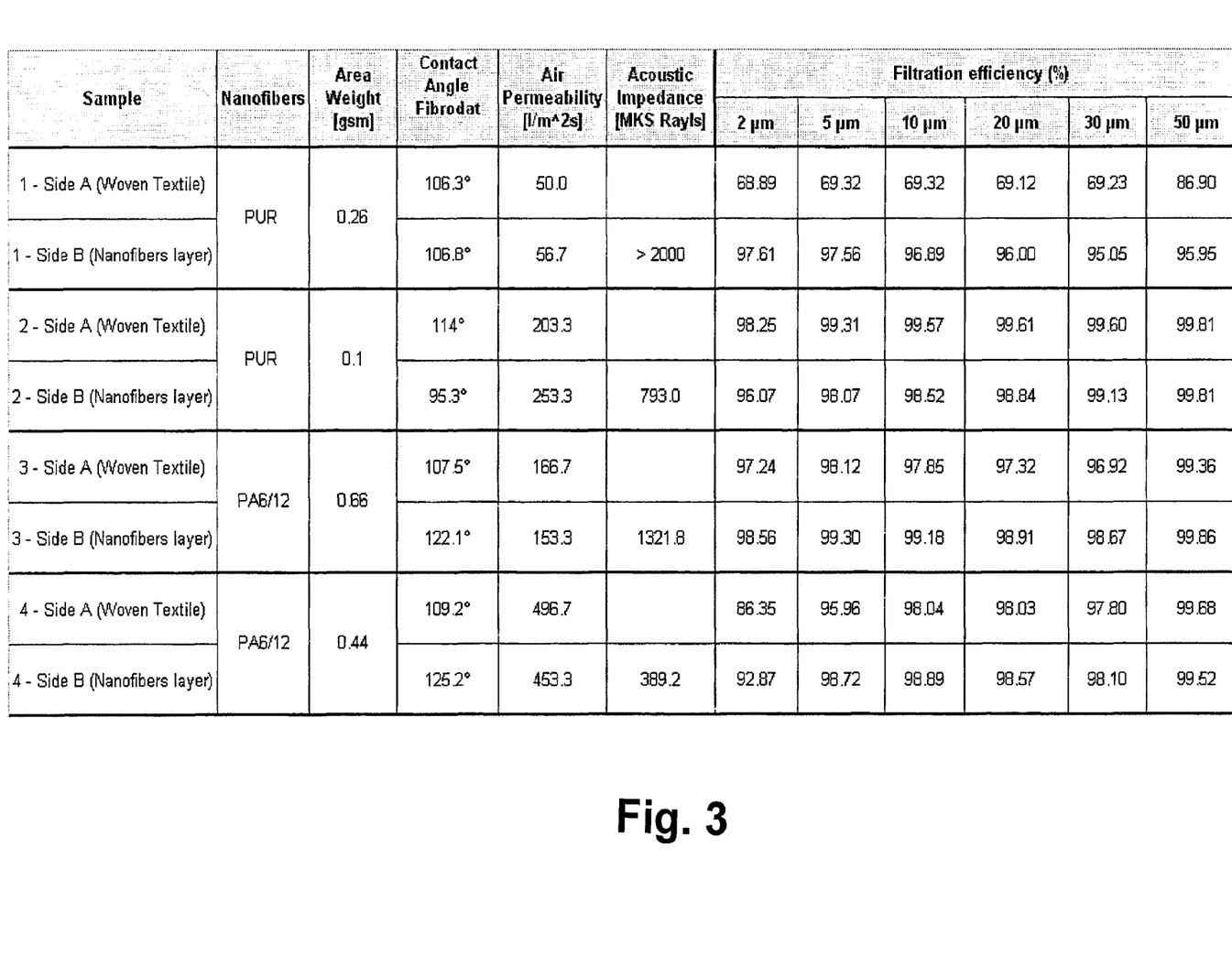
FIG. 3 is another table showing the characterizing parameters of a coupled or laminated filtering material consisting of a fabric material+PA 120.30 WO nanofibers.

The table of FIG. 3 shows the characterizing parameters of the fabric+nanofiber coupled or laminated material.

Figure 4:
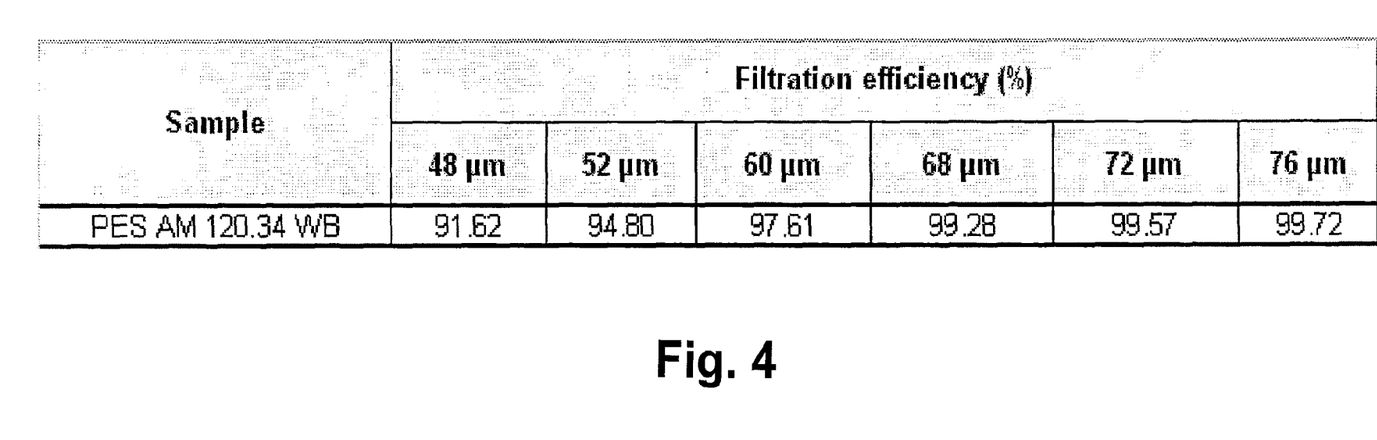
FIG. 4 is another table showing the characterizing parameters of a base PES AM 120.34 WB fabric material.

A Plasma Pre-Processed Nanofiber—Covered PES AM 120.34 WB Fabric:
Characteristics of the Base Fabric
Mesh size=47 μm
Air permeability 4500 I/m^2 s The table of FIG. 4 further shows the characterizing parameter of the base fabric.

Figure 5:
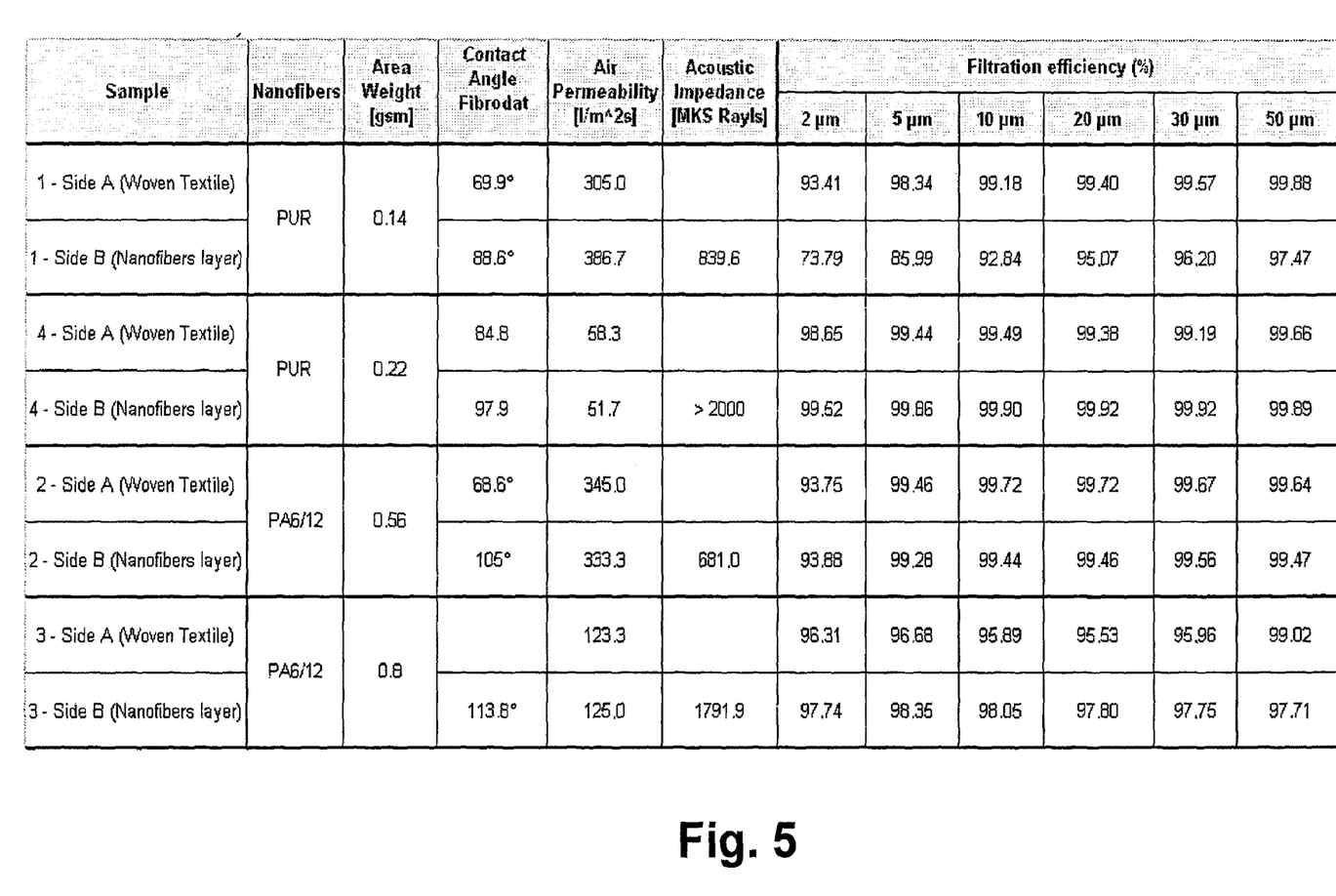
FIG. 5 is another table showing the characterizing parameters of a laminated material consisting of a fabric material+PES AM 120.34 WB nanofibers, the nanofiber layer being deposited on a single side of the fabric.
Figure 6:
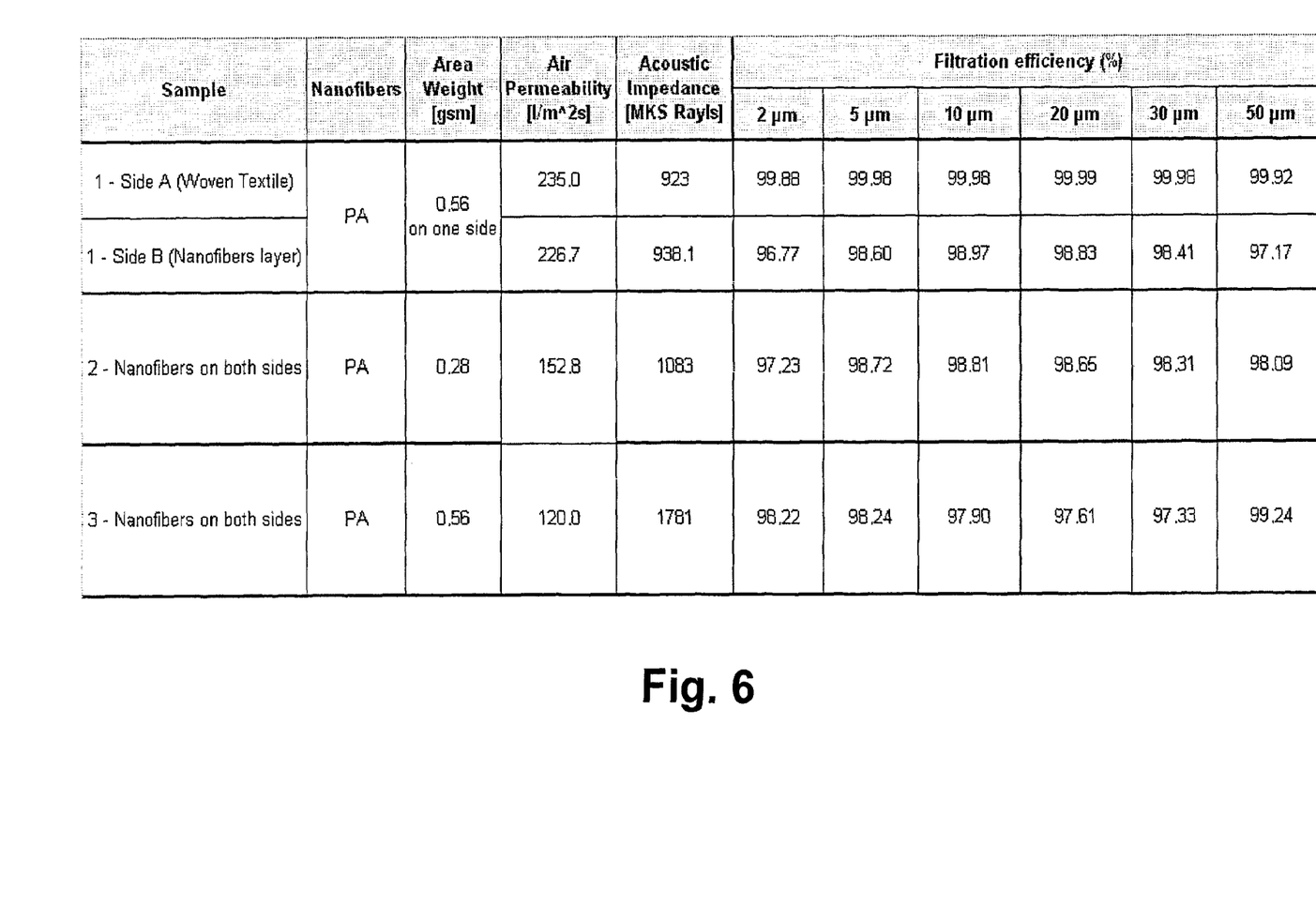
FIG. 6 is another table showing the characterizing parameters of a laminated material consisting of a fabric material+PES AM 120.34 WB nanofibers, the nanofiber layer being deposited both on a single side of the fabric and on the two sides thereof.
Figure 7:
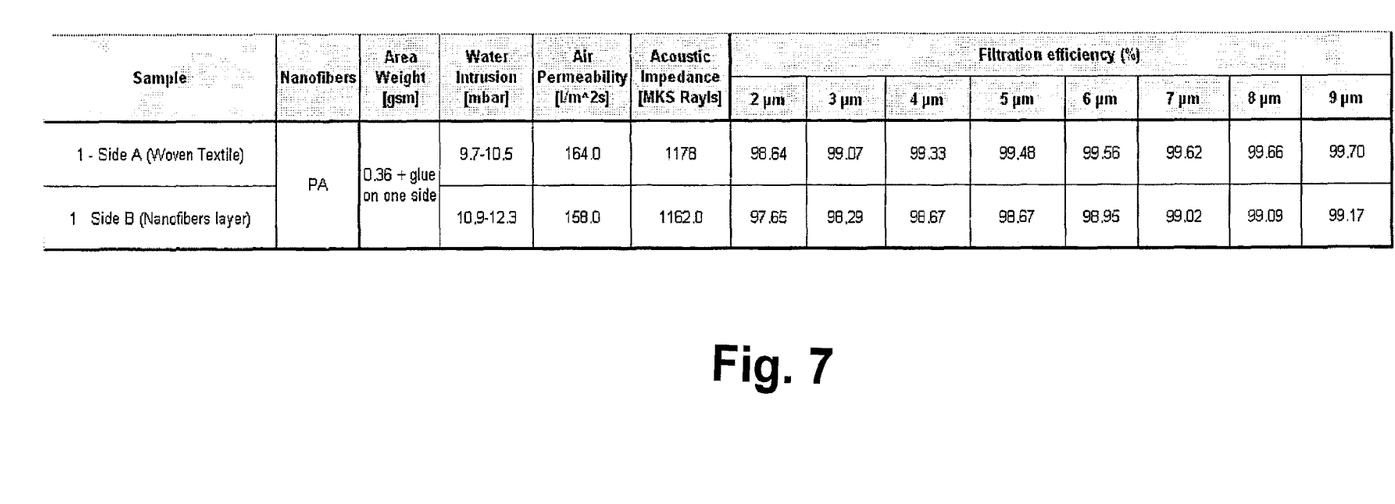
FIG. 7 is another table showing the characterizing parameters of a coupled or laminated material consisting of a fabric material+PES AM 150.27 nanofibers, the nanofiber layer being deposited on an adhesive coated single side of the fabric.

The table of FIG. 5 shows the characterizing parameters of the fabric+nanofiber coupled or laminated material, with the nanofiber layer deposited on a single side or face of the fabric, and the table of FIG. 6 shows the characterizing parameters of the fabric+nanofiber coupled material with the nanofiber layer deposited both on a single fabric side and on the two fabric sides.

A Black Water Repellent Nanofiber Covered PES AM 150.27 Fabric.
Characteristics of the Base Fabric:
Mesh size=38 μm
Air permeability 4500 I/m^2 s
Acoustic impedance=47 MKS Rayls The table of FIG. 3 shows the characteristic parameters of the fabric+nanofiber coupled material, with the nanofiber layer deposited on a single face of the fabric.

The fabric material composite construction according to the present invention has a permeability larger than that of synthetic single-thread precision fabrics with similar values of the mesh size: in fact, the mesh size being the same, the permeability of the coupled filtering media or means is increased by a 2.5 factor with respect to that of a synthetic single-thread precision fabric.

The inventive fabric material composite construction, moreover, provides filtering media having a filtering efficiency of 99% up to 2 μm, and accordingly a high filtering efficiency for particles having a particle size <5 μm (which is the filtering limit of prior filtering precision fabrics).

Moreover, the fabric material composite construction according to the present invention provides a powder rejecting capability, though limited to the filtering fabrics, and has an acoustic impedance less than that of synthetic single thread precision fabrics having similar mesh size values: in fact, the opening mesh size being the same, the sound passage resistance of the inventive coupled filtering means is less by a factor of 1.5 than that of a synthetic single thread precision fabric.

Further important characteristics of the inventive fabric material composite construction are that it has a long duration efficient filtering characteristic with a large life span of the nanofiber coating.

Morphologic Characterizing Parameters of the Filtering Means of Media According to the Present Invention.

The morphology and diameter distribution of the electrospun filaments have been characterized by a SEM investigation, showing that the nanofibers have diameters varying from 80 to 850 μm, depending on the selected sample, and are interconnected to one another to define a thin weft pattern with a very small pore size.

Figure 8:
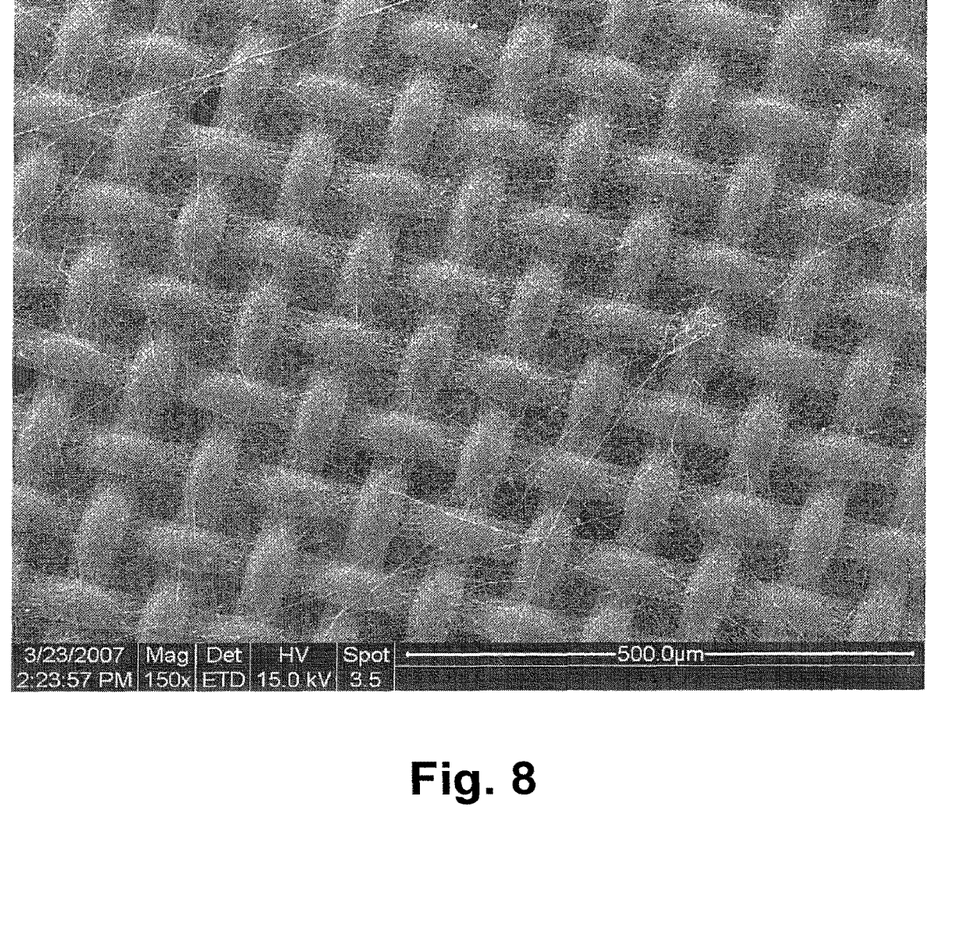
FIGS. 8, 9 and 10 are photos showing the filtering means or media including a synthetic single-thread precision fabric material with a randomly arranged nanofiber layer.
Figure 9:
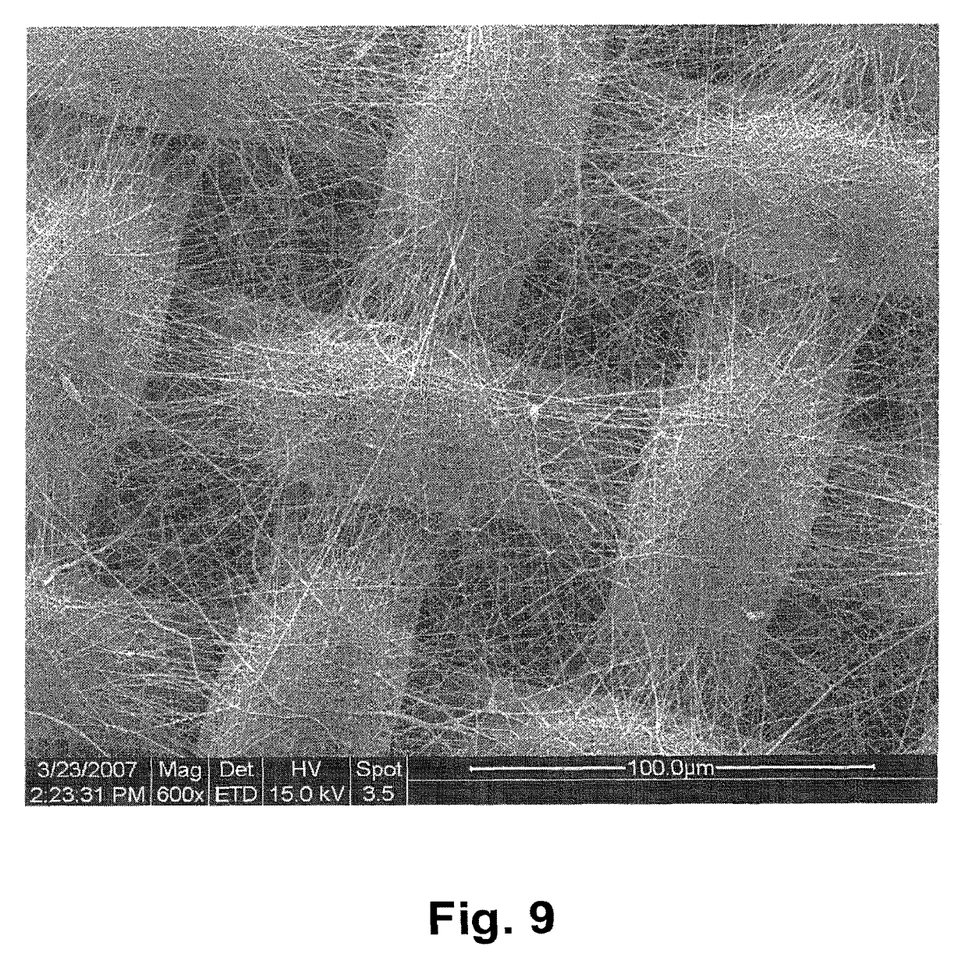
Figure 10:
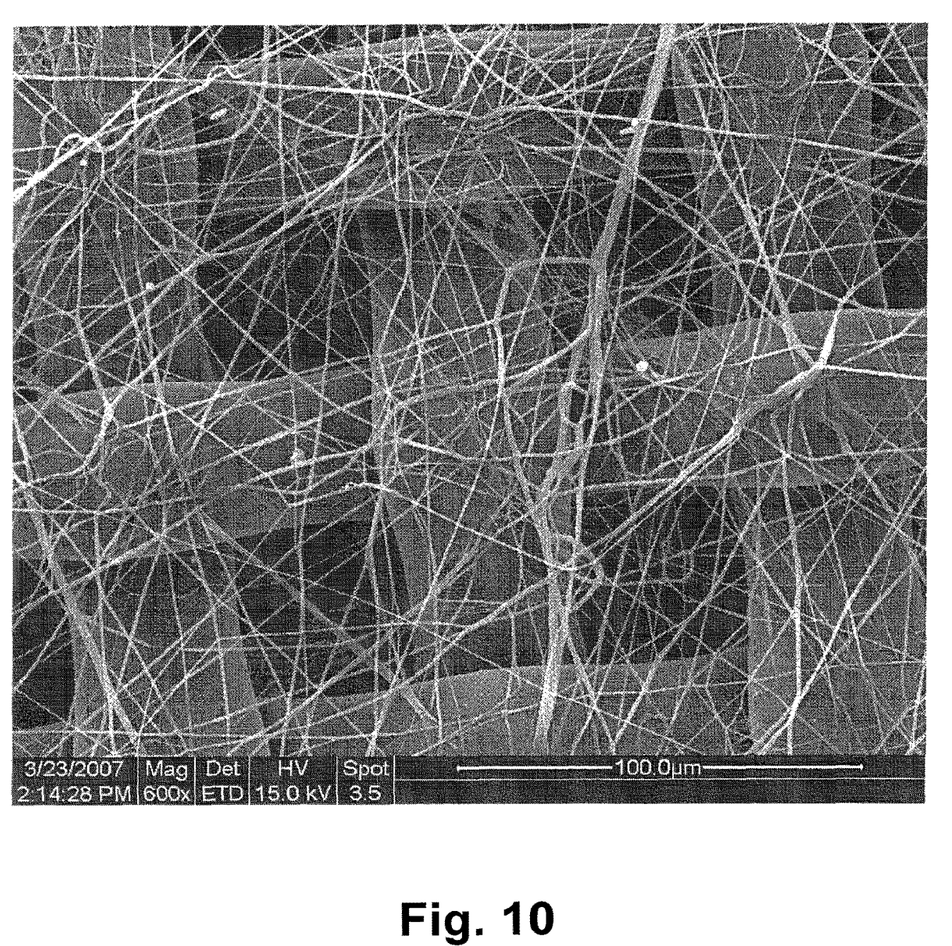

FIGS. 8, 9 and 10 show SEM photos of the filtering media constituted by a synthetic single-thread precision fabric and a nanofiber layer arranged in a random manner.

Figure 11:
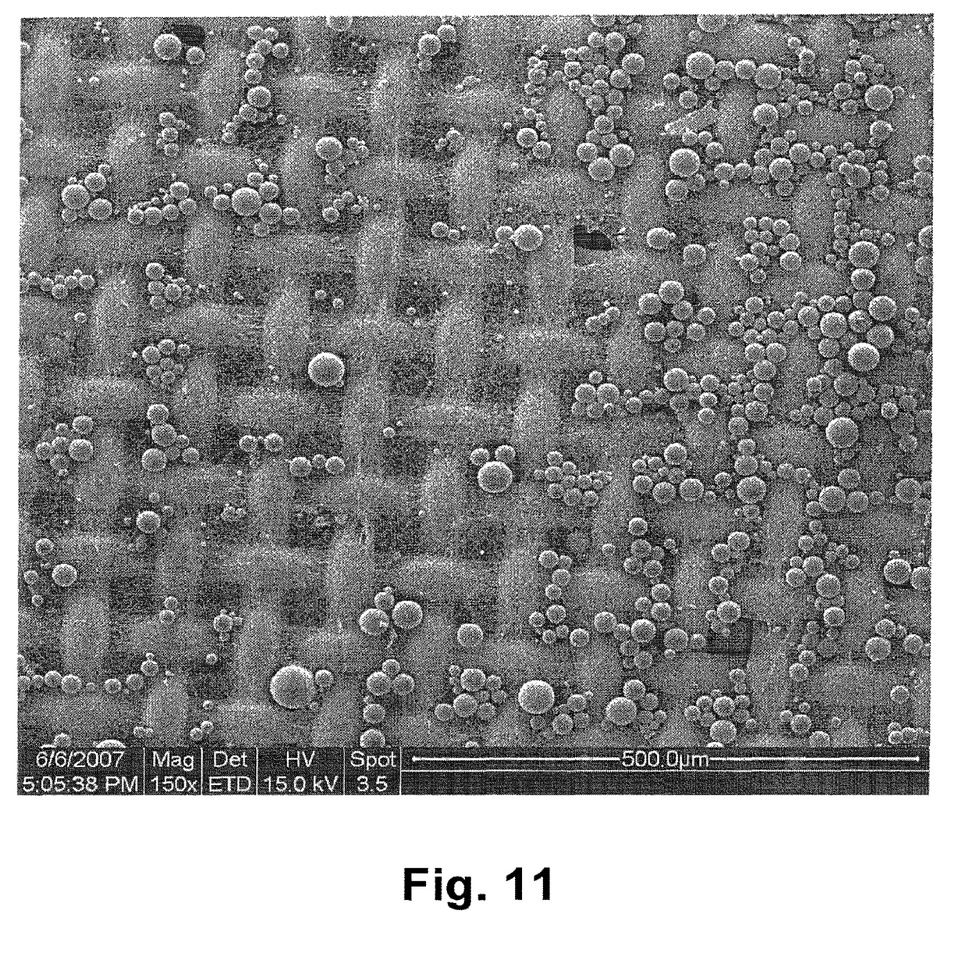
FIGS. 11 and 12 are further photos of the filtering means or media including a synthetic single-thread precision fabric material and a nanofiber layer after a filtering efficiency test.
Figure 12:
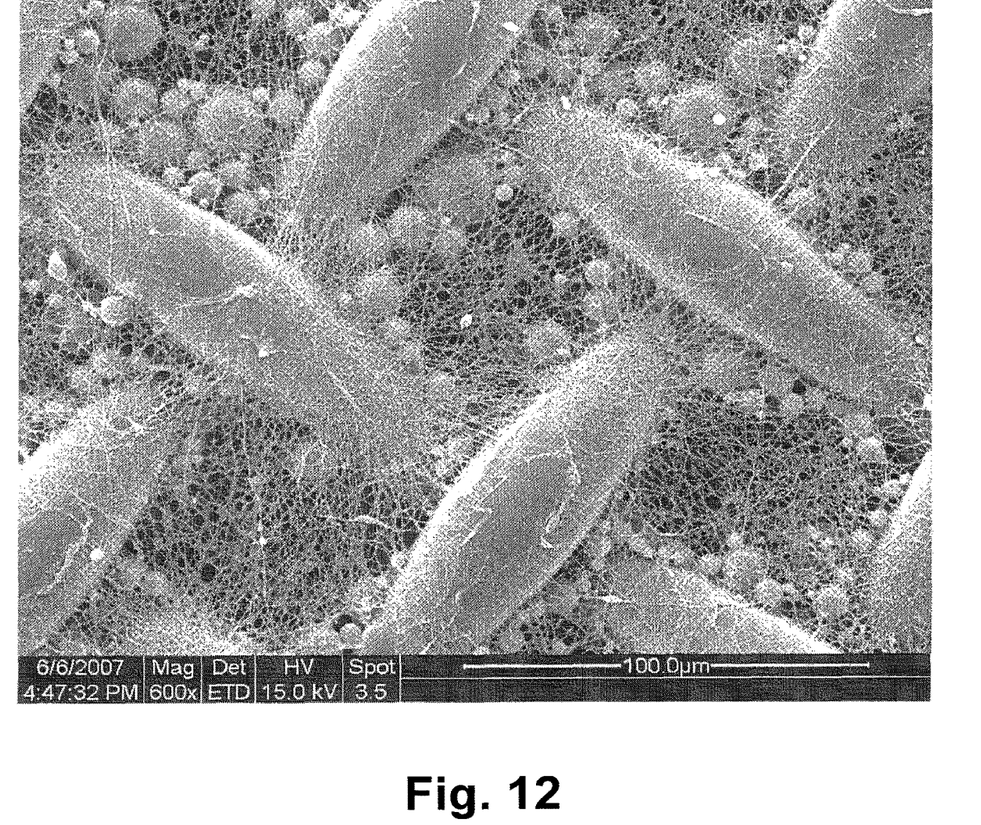

FIGS. 11 and 12 are further SEM photos of the filtering media constituted by a synthetic single-thread precision fabric and a nanofiber layer after a filtering efficiency test.

It should be apparent that the particles contained in the test solution were firmly locked by the fabric component and trapped in the nanofiber component of the inventive filtering media.

It has been found that the invention fully achieves the intended aim and objects.

In fact, the invention has provided a fabric material composite construction for use as a filter means or media allowing to prevent the passage of particles having particle size of 1-2 microns which, up to now, could not be separated by prior filtering fabrics, because of the above mentioned technological limitations of prior weaving processes not allowing to make fabrics having a mesh size less than 5 microns.

Moreover, the composite fabric construction according to the invention provides a precision and selective filtering like that of a typical precision fabric together with a powder rejecting capability (though limited because of the small thickness of the nanofiber layer).

Moreover, the composite fabric construction according to the invention allows the average useful life of the filtering media to be increased due to the provision of the nanofiber layer trapping the particles in the thickness thereof.

The pore size being the same, the permeability is larger, with a consequent less flow/pressure drop between the upstream and downstream portions of the filters.

Moreover, the inventive composite fabric construction has an acoustic impedance smaller than that of prior fabrics having similar mesh size values, which feature is very important for acoustical application where the fabric material also provides a protective function for inner parts of apparatus (such as cellular phones) from ferromagnetic and powder particles.

Finally, the present invention overcomes the use limits of nanofiber membranes due to their poor mechanical strength.

In practicing the invention, the used materials, and the contingent size and shapes, can be any, according to requirements.

The invention claimed is:

1. A method for protecting inner parts of a cellular phone from magnetic and powder particles, said method comprising:

providing a fabric material composite construction that is adapted for acoustical applications, said fabric material composite construction consisting of a knitted fabric made of a synthetic thread and having square openings with a square opening size from 5 μm to 2000 μm and supporting one or more layers of nanofibers having a nanofiber diameter from 100 to 900 nm, said nanofibers being coated on said knitted fabric by an electrospinning coating method such that said nanofibers are embedded in said knitted fabric thereby forming with said knitted fabric a cohesively bound filtering means adapted to prevent particles having a particle size from 1 to 2 μm from passing through said filtering means, said fabric material composite construction having an acoustical impedance adapted to allow sound waves to pass through said fabric material composite construction, said cohesively bound filtering means having a filtering efficiency of 99% for particles having a particle size up to 2 μm, and positioning said composite filtering fabric material in said cellular phone where said composite filtering fabric means protects inner parts of said cellular phone from magnetic and powder particles while allowing sound to pass therethrough.

2. The method according to claim 1, further comprising providing an additional fabric material layer arranged on said nanofibers.

3. The method according to claim 1, comprising coating said nanofibers on a single side of said knitted fabric.

4. The method according to claim 3, further comprising providing an adhesive material layer pre-applied to a face of said knitted fabric, and coating said nanofibers on said adhesive material layer.

5. The method according to claim 1, wherein said synthetic thread is selected from the group consisting of polyester, polyamide, polypropylene, polyphenylsulphide, PEEK, PVDF, PTFE, organic fluorine polymers, PA 6, PA 6/12, polyaramide, PUR, PES, PVA, PVAC, PAN, PEO, PS, polythiophene, kitosan, keratine, collagen and peptide.

6. The method according to claim 1, comprising coating said nanofibers on both sides of said knitted fabric.

7. The method according to claim 1, wherein said nanofibers are plasma processed nanofibers having improved adhesion to said knitted fabric.

8. The method according to claim 1 where particle rates locked by said filtering means and flow resistance of said fabric material composite construction have been verified by measuring permeability and sound passage resistance of said fabric material composite construction by measuring acoustic impedance.

\* \* \* \* \*